United States Patent [19]

Falth

[11] Patent Number: 5,013,700

[45] Date of Patent: May 7, 1991

[54] METHOD OF PRODUCING DEALUMINISED ZEOLITE Y OF HIGH HYDROPHOBICITY

[76] Inventor: Lars Falth, Videvägen 50, S-275 00 Sjobo, Sweden

[21] Appl. No.: 353,627

[22] Filed: May 12, 1989

[30] Foreign Application Priority Data

Nov. 14, 1986 [SE] Sweden .............................. 8604873

[51] Int. Cl.⁵ .......................... B01J 20/16; B01J 29/08
[52] U.S. Cl. ......................................... 502/79; 502/64
[58] Field of Search .................................... 502/79, 64

[56] References Cited

U.S. PATENT DOCUMENTS

| | | | |
|---|---|---|---|
| 4,093,560 | 6/1978 | Kerr et al. .............................. | 502/79 |
| 4,632,749 | 12/1986 | Hilfman ................................ | 502/79 |
| 4,663,025 | 5/1987 | Fu ......................................... | 502/79 |
| 4,840,930 | 6/1989 | La Pierre et al. ..................... | 502/79 |

*Primary Examiner*—Carl F. Dees
*Attorney, Agent, or Firm*—Ralph A. Dowell

[57] ABSTRACT

Activated zeolite Y which has been dealuminised by treatment with gaseous halogen silane at a temperature of up to 600° C., is washed with water, leached with acid and finally heat-treated at a temperature of 800°–1100° C.

7 Claims, No Drawings

METHOD OF PRODUCING SEALUMINISED ZEOLITE Y OF HIGH HYDROPHOBICITY

BACKGROUND OF THE INVENTION

The present invention relates to a method of producing dealuminised zeolite Y of high hydrophobicity.

Field of the Invention

Recently, one has begun to use hydrophobic zeolites for absorption of organic substances from air and water. Zeolites are initially strongly hydrophilic and therefore absorb primarily water molecules. To make the zeolite a useful absorbent of organic substances in the presence of water, both for absorption in the gaseous phase and in a liquid aqueous medium, its ability to absorb water must therefore be as low as possible.

The ability to absorb water depends on the character of the zeolite and its contents of negative charge centres in the lattice structure. To make the zeolite as hydrophobic as possible, it must thus have as few negative charge centres as possible. Such negative charge centres are produced, for example, by aluminum atoms, for which reason one method of reducing the number of negative charge centres is to reduce the aluminum content of the zeolite as far as possible, or down to an $SiO_2/Al_2O_3$ ration of >50.

A number of different methods of dealuminising zeolites are known, for example leaching in acid and treatment with halogen silanes.

In one such prior art method (H. Beyer, J. Belenykaja, Katalysis by Zeolites, p. 203 et seq., 1980, Elsevier, Amsterdam), an Na-Y zeolite is treated with gaseous $SiCl_4$ at temperatures of 457°–557° C., whereby ultrastable zeolites with an $SiO_2/Al_2O_3$ ratio of 40–100 are obtained The resulting zeolite Y has a cell constant $a_o$ of 24.15–24.19 Å.

DE-Cl 31 32 380 describes a development of the above-mentioned method for obtaining catalytically active variants of zeolyte Y, activated zeolite Y being treated with gaseous chloro-, fluoro- or bromosilane at 150°–450° C., i.e. at lower temperatures than in the preceding case. The result is a zeolyte Y having an $Al_2O_3$ content of 4.1–18.4% by weight, corresponding to an $SiO_2/Al_2O_3$ ratio of 6.5–39.9. The cell constant $a_o$ of this zeolite is 24.20–24.60 Å. The reaction product can be annealed at a temperature of 200°–800° C. for regeneration after use for catalysis.

By these prior art methods, it is possible to obtain a zeolite which has a water absorbing capacity of down to about 8% at the best.

SUMMARY OF THE INVENTION

The present invention provides a method in which the hydrophobicity of the zeolite can be further increased all the way down to a water absorbing capacity of about 0.5%.

DESCRIPTION OF THE PREFERRED EMBODIMENT

The hydrophobicity of the zeolite is achieved by the method according to the invention, in which dealuminised zeolite Y of high hydrophobicity is produced by dealumination of activated zeolite Y by treating it with gaseous halogen silane at a temperature of 450°–600° C. The method is characterised in that the dealuminised zeolite is washed with water, leached with acid, and then heattreated at a temperature of 800°–1100° C. In a preferred embodiment, the heat treatment is carried out at a temperature of 900°–950° C. The initial dealumination is preferably carried out at about 500° C.

After the treatment with halogen silane, the zeolite shall have as low a cell constant as possible, preferably at most 24.35 Å.

The acid used for the leaching preferably is hydrochloric acid, although sulphuric acid or nitric acid may also be used.

The method according to the invention drastically reduces the water absorbing capacity of the zeolite, as is shown by the following nonrestrictive Examples.

Example 1

The starting material was a zeolite Y having a cell constant $a_o$ of 24.65 Å. The zeolite was treated in known manner with silicon tetrachloride at a temperature of 500° C., the cell constant decreasing to 24.25 Å (Step A).

The zeolite was then washed with water until it was chloride-free (Step B), leached in 2M HCl at 95° C. for 4 hours (Step C) and finally heat-treated at 900° C. for 1 hour (Step D).

The water absorbing capacity at 43% air humidity and 24° C. was measured after Steps B, C and D, respectively. Before each measurement, the zeolite was activated at 400° C. The results are shown in Table 1.

TABLE 1

| Step | Water absorbing capacity % |
|---|---|
| B | 11.6 |
| C | 11.9 |
| D | 3.0 |

Example 2

The starting material was a zeolite Y having a cell constant $a_o$ of 24.65 Å. The zeolite was treated with silicon tetrachloride at a temperature of 500° C., the cell constant of the zeolite decreasing to 24.32 Å (Step A).

The zeolite thus treated was washed with water until it was chloride-free (Step B), leached with 2M HCl at 95° C. for 4 hours (Step C) and finally heattreated at 900° C. for 1 hour (Step D).

The water absorbing capacity was measured at 43% air humidity and 24° C. Before each measurement, the zeolite was activated at 400° C. The results are shown in Table 2.

TABLE 2

| Step | Water absorbing capacity % |
|---|---|
| B | 14.4 |
| C | 12.4 |
| D | 3.5 |

Example 3

The starting material was a zeolite Y having a cell constant $a_o$ of 24.65 Å. The zeolite was treated with silicon tetrachloride at a temperature of 500° C., the cell constant decreasing to 24.24 Å. (Step A).

The zeolite thus treated was washed with water until it was chloride-free (Step B), leached with 2M HCl at 95° C. for 4 hours (Step C) and finally heattreated at 950° C. for 1 hour (Step D).

The water absorbing capacity was measured at air humidity and 24° C. Before each measurement, the zeolite was activated at 400° C. The results are shown in Table 3.

TABLE 3

| Step | Water absorbing capacity % |
|---|---|
| B | 8.0 |
| C | 9.0 |
| D | 0.7 |

It appears from these Examples that the high-temperature heat treatment method drastically reduces the water absorbing capacity of the zeolite, which is of great importance in, for example, the purification of air from solvents in the presence of water.

I claim:

1. A method of increasing the hydrophobicity of dealuminised zeolite Y, comprising the steps of:
   A. Washing the dealuminised zeolite Y with water to remove substantially all chloride,
   B. Leaching the washed dealuminised zeolite Y with an acid; and
   C. Heating the leached dealuminised zeolite Y to temperatures of between 800°-1100° C.

2. The method of claim 1 in which the leached dealuminised zeolite Y is heated at a temperature of between 900°-950° C.

3. The method of claim 1 or 2 in which the washed zeolite Y is leached with an acid selected from the group of acids consisting of hydrochloric acid, sulphuric acid and nitric acid.

4. The method of claim 3 in which said leached dealuminised zeolite Y is heated for at least approximately 1 hour.

5. The method of claim 4 wherein the dealuminised zeolite Y before the washing step has a cell constant a. of at most 24.35 A.

6. The method of claim 3, in which the washed dealuminised zeolite Y is leached for a period of at least 4 hours.

7. The method of claim 3, dealuminised zeolite Y is obtained by treatment of activated zeolite Y with a gaseous silicon compound selected from the group of compounds consisting of silicon fluorides, silicon bromides and silicon chlorides at a temperature of between 450°-600° C.

* * * * *